(12) United States Patent
Ono

(10) Patent No.: US 11,036,777 B2
(45) Date of Patent: Jun. 15, 2021

(54) ANALYSIS INFORMATION MANAGEMENT SYSTEM

(71) Applicant: SHIMADZU CORPORATION, Kyoto (JP)

(72) Inventor: Koji Ono, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 351 days.

(21) Appl. No.: 16/060,572

(22) PCT Filed: Dec. 11, 2015

(86) PCT No.: PCT/JP2015/084759
§ 371 (c)(1),
(2) Date: Jun. 8, 2018

(87) PCT Pub. No.: WO2017/098650
PCT Pub. Date: Jun. 15, 2017

(65) Prior Publication Data
US 2019/0087386 A1 Mar. 21, 2019

(51) Int. Cl.
*G06F 16/00* (2019.01)
*G06F 16/34* (2019.01)
(Continued)

(52) U.S. Cl.
CPC .............. *G06F 16/34* (2019.01); *G06F 16/16* (2019.01); *G06F 16/9038* (2019.01); *G06F 16/93* (2019.01); *G06Q 10/06* (2013.01)

(58) Field of Classification Search
CPC ...... G06F 16/16; G06F 16/9038; G06F 16/34; G06F 16/93; G06Q 10/06
See application file for complete search history.

(56) References Cited

U.S. PATENT DOCUMENTS

2006/0004866 A1* 1/2006 Lawrence .......... G06F 16/24578
2007/0162308 A1* 7/2007 Peters .................... G06F 19/328
705/2

FOREIGN PATENT DOCUMENTS

JP 2001-050944 A 2/2001
JP 2003-173340 A 6/2003
(Continued)

OTHER PUBLICATIONS

"CLASS—Agent Ver. 2 Nettowaaku Taiou Bunseki Deeta Kanri Tsuuru (Class—Agent Ver. 2, Network-Compatible Analysis Data Management Tool)", [online], Shimadzu Corporation, [accessed on Dec. 4, 2015], the Internet , 3 pages.
(Continued)

*Primary Examiner* — Shiow-Jy Fan
(74) *Attorney, Agent, or Firm* — Sughrue Mion, PLLC

(57) ABSTRACT

In response to a predetermined user operation on a client terminal, a display unit displays a data manager window. Analysis files, which satisfy narrowing conditions among analysis data files registered in a database, are displayed in the window's data file list. The user selects a plurality of files for which a final result record should be created, and selects and indicates a "Create report set" in an operation menu. Then, the selected analysis data files, an analysis report file, and audit trail report file associated with those analysis data files are read from the database and sent to the client terminal. On the client terminal, a data list which shows file names and other information on the analysis data files is created. A final result record report is created, including the data list, descriptions in the audit trail report, descriptions in the analysis report and other relevant information.

3 Claims, 7 Drawing Sheets

(51) Int. Cl.
  *G06Q 10/06*   (2012.01)
  *G06F 16/93*   (2019.01)
  *G06F 16/9038* (2019.01)
  *G06F 16/16*   (2019.01)

(56) References Cited

FOREIGN PATENT DOCUMENTS

| | | |
|---|---|---|
| JP | 2005-077093 A | 3/2005 |
| JP | 2005-321200 A | 11/2005 |
| JP | 2015-152350 A | 8/2015 |

OTHER PUBLICATIONS

"LabSolutions Sougou: Kinou Shoukai Repooto Sakusei (LabSolutions General: Introduction to Functions—Report Preparation)", [online], Shimadzu Corporation, [accessed on Dec. 4, 2015], the Internet , 3 pages.
International Search Report for PCT/JP2015/084759 dated Feb. 16, 2016 [PCT/ISA/210].
Written Opinion for PCT/JP2015/084759 dated Feb. 16, 2016 [PCT/ISA/237].

\* cited by examiner

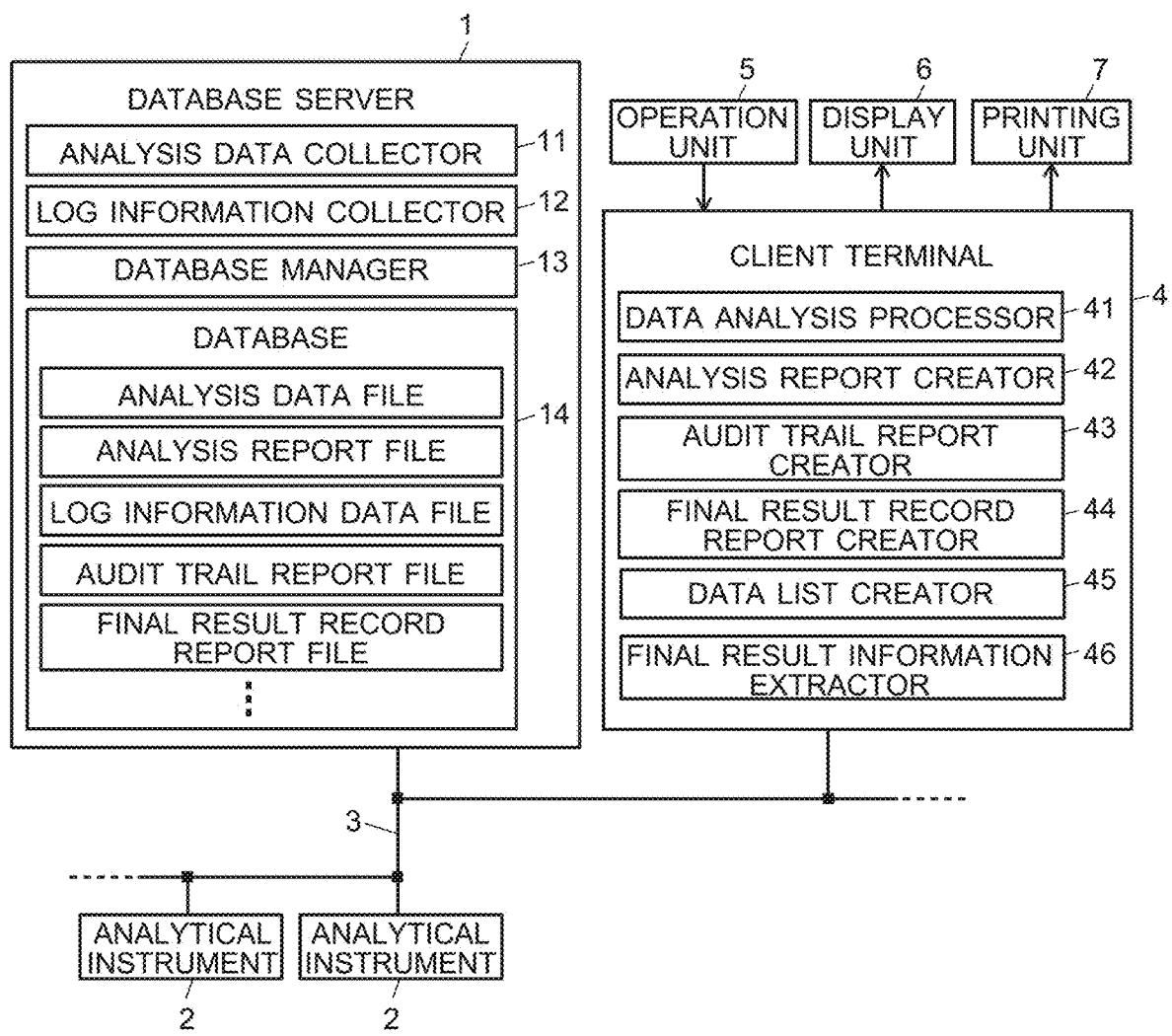

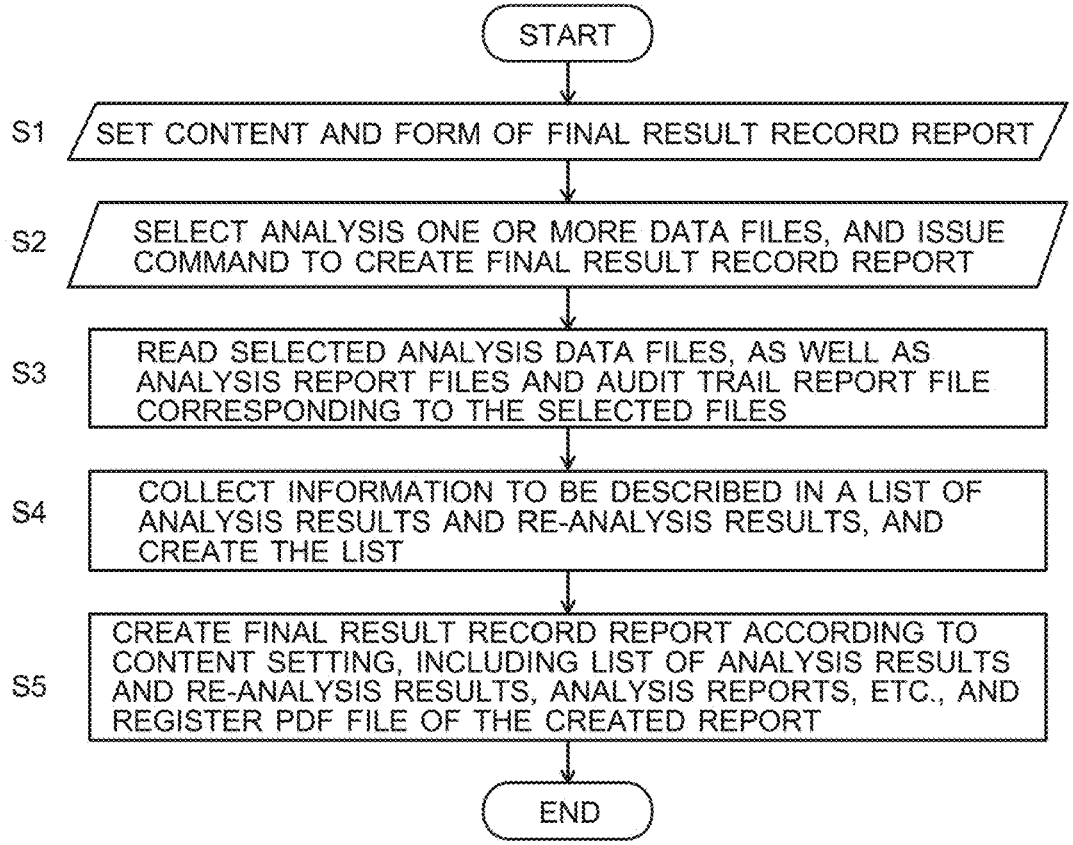
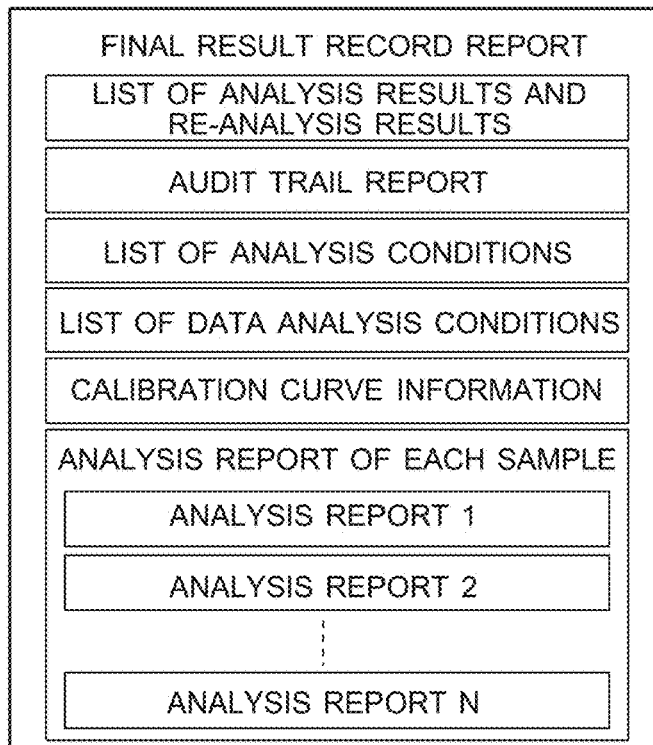

Fig. 7

Audit Trail

| No | Category | Message | Sub-message | Date & Time | | User Name | Device Name |
|---|---|---|---|---|---|---|---|
| 1 | Login/Logout | User logged out. | | 2015/09/17 | 9:43:41 | operator | Inst01 |
| 2 | Information | Batch anaysis completed. | Demo_150916.lcb | 2015/09/17 | 3:06:34 | operator | Inst01 |
| 3 | File operation | File imported. | 2-104-1/_related-4_013.lcd | 2015/09/17 | 2:36:48 | operator | Inst01 |
| 4 | Information | Data collection started. | 2-104-1/_related-4_013.lcd | 2015/09/17 | 1:06:16 | operator | Inst01 |
| 5 | File operation | File imported. | 2-104-1/_related-4_012.lcd | 2015/09/17 | 1:06:04 | operator | Inst01 |
| 6 | Information | Data collection started. | 2-104-1/_related-4_012.lcd | 2015/09/16 | 23:35:44 | operator | Inst01 |
| ... | | | | | | | |
| 106 | File operation | File imported. | 2-104-1/_related-4_001.lcd | 2015/09/16 | 16:07:41 | operator | Inst01 |
| 107 | Information | Data collection started. | 2-104-1/_related-4_001.lcd | 2015/09/16 | 15:47:12 | operator | Inst01 |
| 108 | Information | Batch anaysis started. | Demo_150916.lcb | 2015/09/16 | 15:47:10 | operator | Inst01 |
| 109 | Audit trail | Device contents changed. | inst_Method.lcm | 2015/09/16 | 11:22:47 | operator | Inst01 |
| 110 | Login/Logout | User logged in. | | 2015/09/16 | 11:22:46 | operator | Inst01 |

Fig. 8

| | Data File Name | Version | Data No | Sample Name | Sample ID | Date Acquired | Acquire |
|---|---|---|---|---|---|---|---|
| 1 | -_LCTestBatch_1212015_016.lcd | 1 | 3-22-1 | TestSample0016 | 16 | 12/1/2015 1:51:18 AM(-08:00) | System |
| 2 | -_LCTestBatch_1212015_015.lcd | 2 | 3-21-2 | TestSample0015 | 15 | 12/1/2015 1:50:34 AM(-08:00) | System |
| 3 | -_LCTestBatch_1212015_015.lcd | 1 | 3-21-1 | TestSample0015 | 15 | 12/1/2015 1:50:34 AM(-08:00) | System |
| 4 | -_LCTestBatch_1212015_014.lcd | 1 | 3-20-1 | TestSample0014 | 14 | 12/1/2015 1:49:54 AM(-08:00) | System |
| 5 | -_LCTestBatch_1212015_013.lcd | 1 | 3-19-1 | TestSample0013 | 13 | 12/1/2015 1:49:07 AM(-08:00) | System |
| 6 | -_LCTestBatch_1212015_012.lcd | 1 | 3-18-1 | TestSample0012 | 12 | 12/1/2015 1:48:27 AM(-08:00) | System |
| 7 | -_LCTestBatch_1212015_011.lcd | 1 | 3-17-1 | TestSample0011 | 11 | 12/1/2015 1:47:46 AM(-08:00) | System |
| 8 | -_LCTestBatch_1212015_010.lcd | 1 | 3-16-1 | TestSample0010 | 10 | 12/1/2015 1:47:06 AM(-08:00) | System |
| 9 | -_LCTestBatch_1212015_009.lcd | 1 | 3-15-1 | TestSample0009 | 09 | 12/1/2015 1:46:25 AM(-08:00) | System |
| 10 | -_LCTestBatch_1212015_008.lcd | 1 | 3-14-1 | TestSample0008 | 08 | 12/1/2015 1:45:44 AM(-08:00) | System |
| 11 | -_LCTestBatch_1212015_007.lcd | 1 | 3-13-1 | TestSample0007 | 07 | 12/1/2015 1:45:04 AM(-08:00) | System |
| 12 | -_LCTestBatch_1212015_006.lcd | 1 | 3-12-1 | TestSample0006 | 06 | 12/1/2015 1:44:23 AM(-08:00) | System |
| 13 | -_LCTestBatch_1212015_005.lcd | 1 | 3-11-1 | TestSample0005 | 05 | 12/1/2015 1:43:43 AM(-08:00) | System |
| 14 | -_LCTestBatch_1212015_004.lcd | 1 | 3-10-1 | TestSample0004 | 04 | 12/1/2015 1:43:04 AM(-08:00) | System |
| 15 | -_LCTestBatch_1212015_003.lcd | 1 | 3-9-1 | TestSample0003 | 03 | 12/1/2015 1:42:23 AM(-08:00) | System |
| 16 | -_LCTestBatch_1212015_002.lcd | 1 | 3-8-1 | TestSample0002 | 02 | 12/1/2015 1:41:43 AM(-08:00) | System |
| 17 | -_LCTestBatch_1212015_001.lcd | 1 | 3-7-1 | TestSample0001 | 01 | 12/1/2015 1:41:03 AM(-08:00) | System |

ANALYSIS INFORMATION MANAGEMENT SYSTEM

CROSS REFERENCE TO RELATED APPLICATIONS

This application is a National Stage of International Application No. PCT/JP2015/084759 filed Dec. 11, 2015.

TECHNICAL FIELD

The present invention relates to an analysis information management system for storing and managing data collected with various analytical instruments, such as a chromatograph apparatus, mass spectrometer or spectrophotometer, as well as calculated values and other process results obtained by a data-analyzing process performed on those data.

BACKGROUND ART

In recent years, most of the tasks of processing and managing various data acquired with an analytical instrument, such as a gas chromatograph (GC), liquid chromatograph (LC) or mass spectrometer, have been performed by using a computer on which dedicated software was installed. In particular, a large-scale system in which multiple analytical instruments and computers (e.g. client terminals) as well as a database server and other devices are connected to each other through a communication network has also been proposed in recent years to meet various needs, such as the sophistication of analysis, automatic and efficient analyzing tasks, as well as the necessity for a centralized management of the measuring task and data-analyzing task (see Non-Patent Literature 1 and other documents). Typically, in such an analysis information management system, the data obtained for a sample in an analytical instrument, or process results obtained by analytically processing the data on a client terminal or the like, such as calculated values (e.g. quantitative values), are stored in a single data file for each sample. The data file is registered in, and managed on, a database constructed on a database server or similar location.

Such an analysis information management system has the function of automatically creating an analysis report in which analysis data obtained by analyzing a sample with an analytical instrument, a graph or table created based on those data, as well as various calculated values (e.g. quantitative values) determined by analytically processing those data, are organized in a predetermined form. This report can be provided in the form of a hard copy as well as registered in a database as an electronic file in PDF format or the like (see Non-Patent Literature 2 or other documents).

In recent years, in an LC analysis or GC analysis, an apparatus has often been used which continuously and automatically performs an analysis on each sample while replacing one sample with another using an autosampler in which many samples can be loaded beforehand. In an analysis using such an analytical instrument, it is often the case that a plurality of samples are collectively evaluated from the result of a data-analyzing process based on a plurality of sets of analysis data respectively acquired for those samples by a series of analyses. For example, in the case of investigating a temporal change in the concentrations of a plurality of compounds in a solution, a number of samples are prepared by collecting the solution in small quantity at predetermined intervals of time. An LC analysis is performed on each of those samples to determine the quantity of each target compound, and the temporal change in the concentration of the target compound is evaluated from the quantitative values obtained for that compound.

For such a test, managing the analysis data and the data-analyzing process results obtained for one sample is insufficient; it is essential that the analysis data and data-analyzing process results obtained for a number of samples in a series of analyses be managed in a collective form, i.e. as one lot. Conventionally, for such a management, a user (operator) prepares a list Which describes sample information, analysis conditions, and other pieces of information related to all analysis results and data-analysis results to be managed as one lot. The operator produces a hard copy of each necessary document, such as an analysis report containing such a list along with the analysis results and data-analysis results, as well as an audit trail related to those analysis results and data-analysis results. The hard copies of those documents are gathered in lot units and managed as a final result record.

The task of preparing such a final result record is extremely cumbersome and time-consuming. Additionally, in order to guarantee the integrity of data as required by various regulations concerning electronic records and electronic signatures, as in "FDA 21 CFR Part 11" by the United States Food and Drug Administration (FDA), it is necessary to select an audit trail of log information and analysis reports which correspond to the list of analysis results and data-analysis results, as well as confirm that the selected documents correctly correspond to the list. If a large number of samples are included in one lot, the amount of list and audit trail will be enormously large, so that the task of selection and confirmation will take an extremely long time, and an incorrect operation will easily occur. Furthermore, it has conventionally been necessary to collect necessary pieces of information mentioned earlier when a final result record needs to be obtained. Therefore, it has been difficult to reconstruct the final result record which was once created. It has also been difficult to guarantee that the reconstructed final result record is identical with the previously created version.

CITATION LIST

Non Patent Literature

Non-Patent Literature 1: "CLASS-Agent Ver. 2 Nettowaaku Taiou Bunseki Deeta Kanri Tsuuru (Class-Agent Ver. 2, Network-Compatible Analysis Data Management Tool)", [online], Shimadzu Corporation, [accessed on Dec. 4, 2015], the Internet Non-Patent Literature 2: "LabSolutions Sougou: Kinou Shoukai Repooto Sakusei (LabSolutions General: Introduction to Functions—Report Preparation)", [online], Shimadzu Corporation, [accessed on Dec. 4, 2015], the Internet

SUMMARY OF INVENTION

Technical Problem

The present invention has been developed to solve the previously described problem. Its objective is to provide an analysis information management system with which a final result record that contains a collection of various pieces of information, such as analysis results and data-analysis results for a plurality of samples as well as an audit trail and analysis reports corresponding to those results, can be correctly and easily created even when the analysis results for those samples need to be collectively managed, and with which users can produce a printout of the final result report whose identity is always guaranteed.

Solution to Problem

The present invention developed for solving the previously described problem is an analysis information management system including a communication network, an analytical instrument connected to the communication network via a computer, a database server connected to the communication network, and a client terminal connected to the communication network, in which:

the database server includes a database in which the following kinds of files are to be registered: a data file containing data acquired by performing an analysis on a sample with the analytical instrument and/or data acquired by performing a data-analyzing process using the client terminal; a file of an audit trail report containing a list of various pieces of log information related to the data file; and a file of an analysis report created by inserting the data contained in the data file or information based on the data into each of the various report items related to an analysis, and the client terminal includes:

a) a file selector for allowing a user to select one or more data files for which a final result record needs to be created among data files registered in the database;

b) a list creator for extracting a predetermined item of information from the data contained in the one or more data files selected by the file selector, and for creating a data list which is a list of analysis results and/or data-analyzing process results related to the selected data files; and c) a final result record creator for creating a final result record and registering the final result record as one file in the database, the final result record containing the following contents compiled into a predetermined form: a data list created by the list creator; information described in the file of the audit trail report corresponding to the data files selected by the file selector, the information retrieved from the database; and information described in the file of the analysis report corresponding to the data files selected by the file selector.

In the analysis information management system according to the present invention, there may be a plurality of analytical instruments connected, via a computer or respective computers, to the network, and there may be a plurality of client terminals connected to the network. The database server and the client terminal, or one of the plurality of client terminals, may be located on a single hardware unit. In other words, a computer serving as the client terminal may be configured to additionally function as the database server. The analytical instrument or instruments may be any type of device as long as it can perform an analysis and acquire a certain kind of data.

In the analysis information management system according to the present invention, specific kinds of information are collected through the communication network into the database server and registered in a database constructed on the database server. Those specific kinds of information include: data acquired with the analytical instrument; a result acquired through a data-analyzing process on the client terminal; an audit trail report and an analysis report created by predetermined operations and tasks on the client terminal; and log information, such as operations logs in the analytical instrument or client terminal, or a device log indicating the state of the device. Accordingly, when a user at the client terminal needs to perform a task concerning an analysis, the user accesses the database and downloads necessary information. After the completion of the task, the user registers the information obtained through the task in the database, such as newly created or modified information.

When a user needs to create a final result record of an analysis for one or more samples, the user performs a predetermined operation on the client terminal. In response to the operation, the file selector creates a list of property information including the file names of the data files registered in the database, and displays the list on the screen of a display unit. The file selector recognizes that the one or more data files specified by the user in the list have been selected.

The list creator retrieves, from the database, the one or more data files selected in the previously described manner, and extracts predetermined items of information from the data contained in or associated with those data files. Then, the list creator creates a data list which is a list of analysis results and/or data-analyzing process results related to the selected data files. The system may be configured to allow users to previously set the items to be included in the list. Examples of the items include: file name, sample name, sample ID, device name, device ID, date and time of data acquisition, as well as date and time of data approval.

The final result record creator retrieves, from the database, the file of an audit trail report and that of an analysis report corresponding to the one or more data files selected in the previously described manner, and creates a report of the final result record in which the information described in the data list and the retrieved files is compiled into a predetermined form. Subsequently, the final result record creator creates a file containing the image of a page or pages of the report in the same appearance as a printed version, as with the typically used PDF format (portable document format), and registers the file in the database. Thus, the final result record report can be printed out any time.

The correspondence relationship of the data files with the file of the audit trail report or that of the analysis report file can be established, for example, by using a data. ID which is issued to identify each individual data file. As another possible method, when the file of an audit trail report or that of an analysis report is registered in the database, link information which shows their relationship with the data files may be created and additionally registered in the database. In any case, once the file of the audit trail report and that of the analysis report have been registered in the database, those files can be easily retrieved when a data file associated with them is specified.

In a preferable mode of the analysis information management system according to the present invention, the client terminal further includes d) a batch setter for previously setting, as one batch, data files containing data acquired by individually analyzing a plurality of samples, and the file selector is configured to select a batch which is set by using the batch setter, to thereby select a plurality of data files corresponding to the batch.

After a continuous analysis has been carried out for a plurality of samples, when a user needs to create a single final result record which reflects the data acquired in each analysis in the continuous analysis or data-processing results based on those data, the user can use the batch setter to set, as one batch, the data files respectively obtained for the plurality of samples subjected to the continuous analysis. For example, this can be performed immediately before the process of creating the final result record, or in the earliest case, before the execution of the continuous analysis. This eliminates the necessity to select each individual data file when selecting data files to create the final result record. The user only needs to select one corresponding batch, whereby a plurality of necessary data files can be collectively selected. This particularly decreases the time and labor of the user in the case where there are a considerable number of data files to be selected. Incorrect selection of a file is also less likely to occur.

In the analysis information management system according to the present invention, when a user is going to create a final result record, if the file of an audit trail report and that of analysis report corresponding to the data file concerned are already present in the database, those files can be simply read out. However, in some situations, those files may not be present, i.e. they may not be created yet.

To deal with such a situation, as one preferable mode of the present invention, the analysis information management system may further include:

a report creator for creating an analysis report in response to selection of one or more data files by the file selector, by inserting information based on the selected data files into each report item on a report template prepared beforehand.

As another preferable mode of the present invention, the analysis information management system may further include:

a log information extractor for extracting pieces of log information related to the one or more data files selected by, the file selector, the log information obtained within a period of time from a login to a logout on the analytical instrument and/or the client terminal; and an audit trail creator for creating an audit nail report for the one or more data files by organizing the pieces of log information, extracted by the log information extractor, in time-series order.

According to these configurations, if the analysis report or audit trail report is not created yet when a final result record is going to be created, the analysis report or audit trail report related to the data files for which the final result record should be created is automatically created after those data files have been selected. Therefore, a final result record report including the information in those reports can be successfully created.

Advantageous Effects of Invention

With the analysis information management system according to the present invention, users only need to select one or more data files for which a final result record should be created. The system automatically creates the final result record which includes various kinds of information related to those data files. The record is registered, for example, as a PDF file in the database. Therefore, users do not need to perform cumbersome, time-consuming tasks, such as the search of an enormous amount of information for an analysis report or audit trail report related to target data files as well as the creation of a list which describes sample information, analysis conditions and other important items of information concerning all analysis results and data-analysis results to be managed as one lot.

The system can also prevent discrepancies between the content of the list and the attached analysis report or audit trail due to incorrect operations by users, as well as an artificial choice of information. Thus, a highly reliable final result record can be obtained.

The created final result record is registered in the database. Therefore, for example, when it is necessary to check the final result record for one lot or submit a report of the final result record, users can quickly print the report whose identity is guaranteed.

BRIEF DESCRIPTION OF DRAWINGS

FIG. 1 is a schematic configuration diagram of one embodiment of the analysis information management system according to the present invention.

FIG. 2 is a flowchart showing the final result record creation process in the analysis information management system according to the present embodiment.

FIG. 3 is a model diagram showing one example of the form of a final result record report.

FIG. 7 is a diagram showing one example of an audit trail report.

FIG. 8 is a diagram showing one example of a data list.

DESCRIPTION OF EMBODIMENTS

Figure 4:
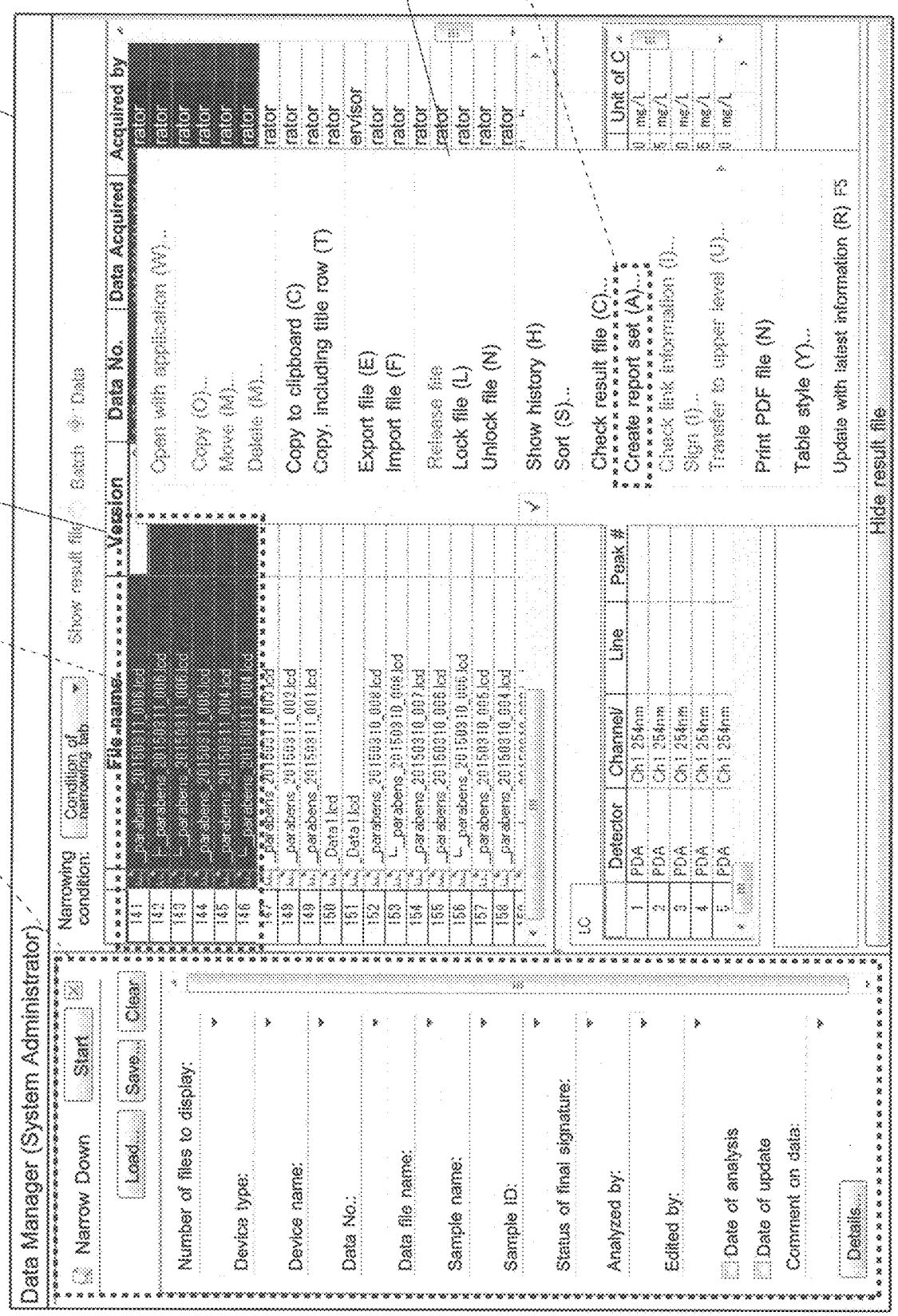
FIG. 4 is a model diagram showing one example of a data manager window for final result record creation.

One embodiment of the analysis information management system according to the present invention is hereinafter described with reference to the attached drawings.

FIG. 1 is a schematic configuration diagram of the mam components of the analysis information management system according to the present embodiment.

The analysis information management system according to the present embodiment includes: one or more analytical instruments 2 for performing a predetermined analysis on a sample and collecting measurement data; a database server 1 which is actually a computer; and a client terminal 4 which is actually a personal computer. These three kinds of devices are connected to each other through a communication network 3, such as a local area network (LAN). An operation unit 5, which includes a mouse, keyboard and other devices, as well as a display unit 6 and a printing unit 7 are connected to the client terminal 4. Normally, an operation unit, display unit and other devices are also connected to the database server 1, although those units are not shown in FIG. 1.

Although the configuration shown in FIG. 1 has a single client terminal 4, there may be multiple client terminals. The client terminal 4 may additionally function as the database server 1. Each analytical instrument 2 may have built-in functions which effectively work similar to a computer and enable direct connection to the communication network 3. However, more typically, the analytical instrument is connected to the communication net network 3 via a personal computer (not shown). In that case, two or more analytical instruments 2 may be connected to a single personal computer which is connected to the communication network 3. Such a personal computer may be configured to serve as a client terminal 4. The type of analytical instruments 2 is not specifically limited. Different types of analytical instruments may be connected to the communication network 3. For convenience of description, it is hereinafter assumed that the analytical instruments 2 are all liquid chromatograph (LC) apparatuses.

The database server 1 includes an analysis data collector 11, log information collector 12, database manager 13, database 14 and other functional blocks. The database 14 is used to register various files, such as the analysis data file, result report file, audit trail report file, final result record report file, and log information data file. The client terminal 4 includes a data analysis processor 41, analysis report creator 42, audit trail report creator 43, final result record report creator 44, data list creator 45, final result information extractor 46 and other functional blocks. As noted earlier, the database server 1 and the client terminal 4 are actually computers. Therefore, the aforementioned functional blocks are embodied by dedicated programs which are previously installed on those computers and executed on the same computers.

In the database server 1, the analysis data collector 11 collects data acquired in each analytical instrument 2 by an LC analysis on a sample as well as various items of information related to the analysis through the communication network 3. The collected data and information are registered through the database manager 13 in the database 14 as an analysis data file. When the analysis data file is registered, a data ID for uniquely identifying the file is automatically given to the file. The analysis data file normally contains various items of data and information related to an analysis on one sample. That is to say, in addition to the analysis data acquired through the analysis, those items of data and information include: sample information, such as the name and amount of the sample; device ID for identifying an analytical instrument used for the analysis; date and time of the analysis; analyzer user ID for identifying an operator who carried out the analysis; analysis conditions applied in the analysis (e.g. the flow velocity of the mobile phase); and calibration curve information for quantitative determination. The same analysis data file may additionally be used to store various kinds of calculated values obtained through a data-analyzing process based on the analysis data by the data-analyzing processor 41 in the client terminal 4 as well as other related items of information.

The log information collector 12 collects various items of information through the communication network 3 and registers the information through the database manager 13 in the database 14 as the log information data file. The items of information include operations and tasks performed by users on all analytical instruments 2, client terminal 4 and other devices included in the present system, as well as information indicating the state of each device, such as an error which occurred in an analytical instrument 2, client terminal 4 or other devices during an execution of a measurement or data-analyzing process. For example, the operation log data file, which shows operation logs, contains various kinds of data and information related to each specific operation: content of the operation; device ID for identifying an analytical instrument 2 or client terminal 4 on which the operation was performed; date and time of the operation; and user ID for identifying an operator who performed the operation.

Next, various processing operations to be performed on the client terminal 4, with analysis data files stored in the database 14, are described.

Analysis Report Creation Process

The analysis report creator 42 in the client terminal 4 automatically creates an analysis report in a predetermined form based on the various data and information contained in an analysis data file, and registers the analysis report in the database 14 as an analysis report file in PDF format.

Specifically, an operator in charge of an analysis operation performs a predetermined operation with the operation unit 5 to select an analysis data file for which an analysis report should be created and a template for the same report, and issues a command to create the report. Then, the analysis report creator 42 begins to operate and accesses the database server 1 to read the report template concerned and the specified analysis data file from the database 14. A report template is a form (format) of a report in which various report items, such as the sample information, chromatogram and peak report, are appropriately arranged. The provider (manufacturer) of the present system can previously create such templates and register them in the database 14.

The analysis report creator 42 creates an analysis report by inserting necessary information into the information presentation field of each report item in the read report template. Examples of the inserted information include: a chromatogram created from the data contained in the analysis data file; a peak table showing the information concerning the peaks on the chromatogram obtained by performing a data-analyzing process on the chromatogram; and sample information contained in the analysis data file. The analysis report may also include a check result entry field for each report item to allow a checker, who is different from the operator, to check the content of the analysis report and enter the check result as well as describe the reason for the rejection of the content if the checker has concluded that the reported content is unacceptable.

Figure 6:
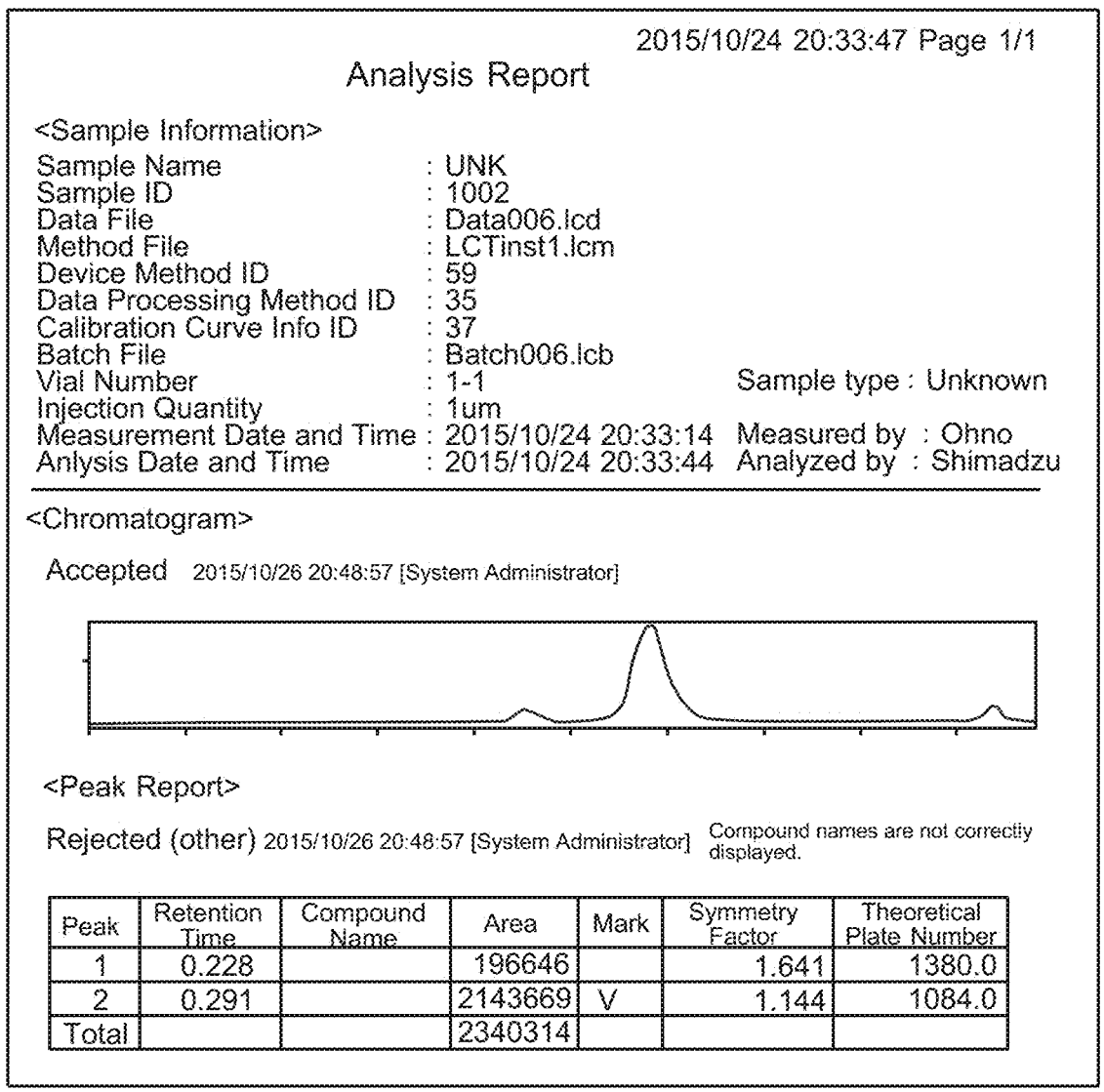
FIG. 6 is a diagram showing one example of an analysis report.

FIG. 6 is a diagram showing one example of the analysis report which is automatically created. In the present example, there are three report items, i.e. the sample information, chromatogram and peak report, in which the chromatogram and peak report are each provided with a check result entry field.

A method for creating a report template in which check result entry fields are provided is described, for example, in the Japanese Patent Application No. 2015-239016, which is a prior application filed by the applicant.

Audit Trail Report Creation Process

The audit trail report creator 43 in the client terminal 4 automatically collects various pieces of log information related to one or more analysis data files, creates a list showing those pieces of log information arranged in time-series order, and registers an audit trail report inclusive of the list in the database 14 as an audit trail report file in PDF format.

Specifically, an operator performs a predetermined operation with the operation unit 5 to select analysis data files for which an audit trail should be created, and issues a command to create the audit trail. Then, the audit trail report creator 43 begins to operate and accesses the database server 1 to read all log information files related to the specified analysis data files. The "all log information files" contain two types of log information: the log information identified by the device ID of the analytical instrument with which the data contained in the analysis data files were acquired and the user ID of an analysis operator who took charge of the analysis, obtained within a period of time from login to logout including the date and time of the creation or registration of the analysis data files; and the log information which indicates a certain kind of file operation performed on each specified analysis data file.

The former type of log information can be collected by searching the log information in the database 14 using, as search keys, the device ID, user ID as well as date and time of creation (or registration) contained in the analysis data files or associated with those files as property information for example. The latter type of log information can be collected by searching the log information in the database 14 using, as a search key, the data ID associated with each analysis data file. It is also possible to issue a login ID which allows for unique identification of a time range from a login operation to the logout on any of the devices in the present system, i.e. the analytical instruments 2, client terminal 4 and other devices, and to add the login ID to every log information data file and every analysis data file. This facilitates the extraction of the log information related to an analysis data file.

The audit trail report creator 43 creates an audit trail by organizing a large number of pieces of log information extracted in the previously described manner in time-series order, and creating a list which shows messages that briefly describe the contents of the respective pieces of log information along with a portion of the log information.

FIG. 7 is a diagram showing one example of the audit trail report which is automatically created.

Final Result Record Report Creation Process

Figure 5:
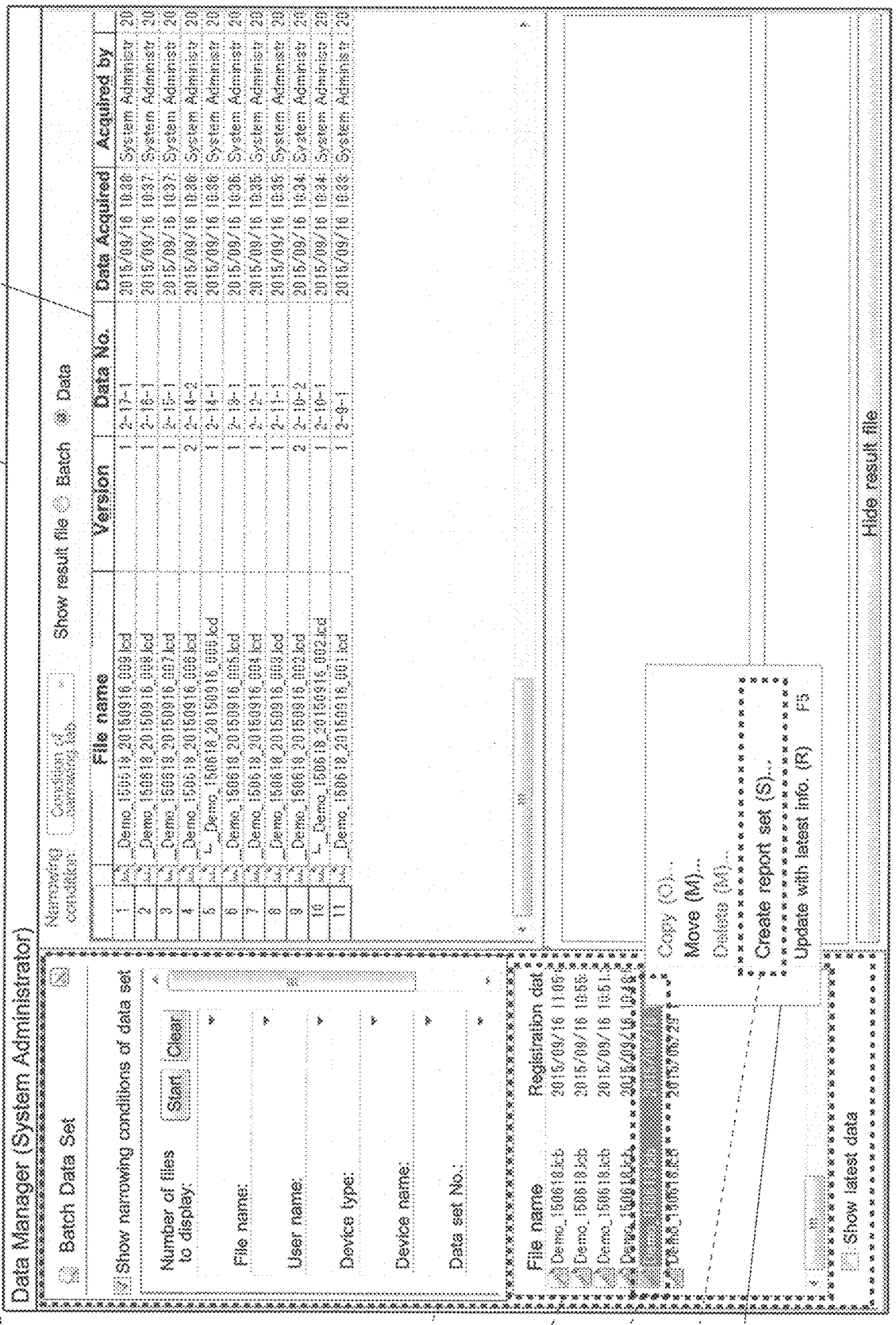
FIG. 5 is a model diagram showing another example of the data manager window for final result record creation.

FIG. 2 is a flowchart showing the final result record creation process. FIG. 3 is a model diagram showing one example of the form of a final result record report. FIG. 4 is a model diagram showing one example of a data manager window for final result record creation. FIG. 5 is a model diagram showing another example of the data manager window for final result record creation.

In advance of the creation of the final result record, an operator performs a predetermined operation with the operation unit 5 of the client terminal 4 to specify the contents and form of the final result record report (Step S1). For example, in the case of FIG. 3, the final result record report can contain various items of information described in the following order: a list of analysis results and re-analysis results, audit trail report, analysis condition list, data-analysis condition list, calibration curve information, as well as analysis reports for individual samples. The items and form of the report may be appropriately changed; for example, the order of the items may be appropriately changed, some of those items may be removed, or new items may be added. Step S1 may be bypassed if the default setting of the contents and form of the final result record report can be used as it is, or if there is no need to change the previously used setting.

Subsequently, the operator performs a predetermined operation with the operation unit 5 of the client terminal 4, whereupon the final result record report creator 44 begins to operate and displays a data manager window 100 for final result record creation on the screen of the display unit 6. As shown in FIG. 4, the data manager window 100 has a file selection setting area 101 located in its left part and a data file list 102 located in its upper right part. The setting in the file selection setting area 101 can be selected from two modes: "narrow down" and "batch data set". FIG. 4 is the case of the "narrow down" setting, while FIG. 5 is the case of the "batch data set" setting.

In the case of using the "narrow down" setting in the file selection setting area 101 as shown in FIG. 4, the operator sets the narrowing conditions in one or more narrowing items in the file selection setting area 101. Then, the final result record report creator 44 accesses the database 14 to search for analysis data files which satisfy the narrowing conditions, and displays a list of the thereby found analysis data files in the data file list 102. It is naturally possible to refine the search with additional narrowing conditions and decrease the number of analysis data files if there is an excessive number of analysis data files displayed in the data file list 102.

The operator specifies one or more analysis data files for which the final result record report should be created among the analysis data files displayed in the data file list 102, by a clicking operation with a mouse on the screen or similar operations. In FIG. 4, the six analysis data files denoted by reference sign 103 are selected. The selected files are highlighted. Then, for example, the operator presses the right button of the mouse on the selected items, whereby an operation menu 104 as shown in FIG. 4 is displayed. The operator selects the "Create report set" 105 in this menu and performs the clicking operation. This operation corresponds to the command to create the final result record (Step S2).

Upon receiving the command, the final result information extractor 46 reads the one or more selected analysis data files as well as the audit trail report file and the analysis report file related to those analysis data files from the database 14 (Step S3). The correspondence relationship of the analysis data files with the audit trail report file and the analysis report file can be established by using the data ID which identifies each analysis data file as described earlier. As another possible method, when an audit trail report file or analysis report file is registered in the database 14, link information which shows the relationship with the analysis data files may be created and registered in the database 14 so that the audit trail report file and analysis report file concerned can be located by referring to this link information.

The data list creator 45 creates a data list showing the file name, sample name, sample ID and other items based on the data and information contained in the read analysis data files (Step S4). FIG. 8 shows one example of the data list (in part). It is preferable to allow users to arbitrarily set the items to be displayed in the data list.

According to the form of the final result record report specified in Step S1, the final result record report creator 44 creates an image of the final result record report in which the necessary contents are arranged, including the list of analysis results and re-analysis results prepared in Step S4, content of the audit trail report (list of the log information in time-series order) as shown in FIG. 7, content of the analysis report as shown in FIG. 6, as well as the analysis condition, data-analysis condition, calibration curve and other pieces of information contained in the analysis data files. The image of the final result record report is converted into a PDF file and registered in the database 14 (Step S5).

In this manner, a final result record report which holds a collection of various kinds of information and data related to one or more analysis data files selected by an operator be created, and a PDF file of the report can be registered in the database 14. Upon receiving a command to print the report from the operator, the system produces a printout of the created report through the printing unit 7. At a later point in time, the operator at the client terminal 4 can reprint the final result record report file with always the same content by specifying the file name of the final record result report file registered in the database 14 and issuing the print command.

Selecting a plurality of analysis data files in the data file list 102 is also possible in the case of the data manager window 100 shown in FIG. 4, i.e. in the case of using the "narrow down" setting in the file selection setting area 101. However, when the plurality of analysis data files to be selected are previously known or the plurality of samples from which those analysis data files have been obtained can be handled as one lot, the use of the "batch data set" setting is more convenient and less likely to cause incorrect operations.

That is to say, in the case of using the "batch data set" setting, a plurality of analysis data files to be collectively processed are previously specified and registered in a batch file. The batch file does not contain any substantial data (e.g. analysis results); it is a file which records the properties or similar information concerning a plurality of analysis data files.

In the case of the "batch data set" setting shown in FIG. 5, the operator sets narrowing conditions in one or more narrowing items in the file selection setting area 101. Then, the batch files which satisfy the narrowing conditions are displayed in a batch file list 106 displayed in the file selection setting area 101. The operator indicates the target batch file among those batch files by a clicking operation with the mouse on the screen or similar operations. In FIG. 5, the batch file indicated by reference sign 107 is selected. The selected file is highlighted. Upon selection of a batch file, the analysis data files registered for the batch file are displayed in the data file list 102. The operator presses the right button of the mouse on this list, whereby an operation menu 108 as shown in FIG. 5 is displayed. The operator selects the "Create report set" 109 in this menu and performs the clicking operation. This operation corresponds to the command to create the final result record for all analysis data files specified in the form of a batch file.

In this manner, the operator can collectively select a plurality of analysis data files to create the final result record related to those analysis data files.

As noted in the previous description, a data file which contains data acquired through an analysis may be used to contain additional information, such as the data obtained through a data-analyzing process. The system can also be configured to similarly handle calculation result data files which contain data obtained through a data-analyzing process, such as the result of a quantitative analysis, but does not contain sample analysis data, i.e. to automatically create a final result record related to one or more calculation result data files when those files are selected by a user.

It should be noted that the previous embodiment is a mere example of the present invention, and any modification, addition or change appropriately made within the spirit of the present invention will evidently fall within the scope of claims of the present application.

REFERENCE SIGNS LIST

1 . . . Database Server
11 . . . Analysis Data Collector
12 . . . Log Information Collector
13 . . . Database Manager
14 . . . Database
2 . . . Analytical Instrument
3 . . . Communication network
4 . . . Client Terminal
41 . . . Data Analysis Processor
42 . . . Analysis Report Creator
43 . . . Audit Trail Report Creator
44 . . . Final Result Record Report Creator
45 . . . Data List Creator
46 . . . Final Result Information Extractor
5 . . . Operation Unit
6 . . . Display Unit
7 . . . Printing Unit

The invention claimed is:

1. An analysis information management system including a communication network, an analytical instrument connected to the communication network via a computer, a database server connected to the communication network, and a client terminal connected to the communication network, wherein:
the database server includes a database in which following kinds of files are to be registered: a data file containing data acquired by performing an analysis on a sample with the analytical instrument and/or data acquired by performing a data-analyzing process using the client terminal; a file of an audit trail report containing a list of various pieces of log information related to the data file; and a file of an analysis report created by inserting the data contained in the data file or information based on the data into each of the various report items related to an analysis, and
the client terminal is configured to:
a) previously set, as one batch, data files containing data acquired by individually analyzing a plurality of samples;
b) select a plurality of data files for which a final result record needs to be created among data files registered in the database in response to a user's input, the plurality of data files corresponding to a batch which is previously set;
c) extract a predetermined item of information from the data contained in the selected data files, and create a data list which is a list of analysis results and/or data-analyzing process results related to the selected data files; and
d) create a final result record and register the final result record as one file in the database, the final result record containing following contents compiled into a predetermined form: a created data list; information described in the file of the audit trail report corresponding to the selected data files, the information retrieved from the database; and information described in the file of the analysis report corresponding to the selected data files.

2. The analysis information management system according to claim 1, wherein the client terminal is further configured to:
create an analysis report in response to selection of the selected data files, by inserting information based on the selected data files into each report item on a report template prepared beforehand.

3. The analysis information management system according to claim 1, wherein the client terminal is further configured to:
extract pieces of log information related to the selected data files, the log information obtained within a period of time from a login to a logout on the analytical instrument and/or the client terminal; and
create an audit trail report for the plurality of data files by organizing the extracted pieces of log information, in time-series order.

* * * * *